United States Patent
Duan et al.

(10) Patent No.: US 12,248,406 B2
(45) Date of Patent: Mar. 11, 2025

(54) MANAGEMENT OF IOMMU TLB ENTRIES FOR COMPUTE UNITS OF A SIMD PROCESSING DEVICE

(71) Applicant: ALIBABA (CHINA) CO., LTD., Zhejiang Province (CN)

(72) Inventors: Lide Duan, Sunnyvale, CA (US); Qichen Zhang, Shanghai (CN); Shijian Zhang, Beijing (CN); Yen-Kuang Chen, Palo Alto, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 86 days.

(21) Appl. No.: 18/065,175

(22) Filed: Dec. 13, 2022

(65) Prior Publication Data

US 2024/0045809 A1    Feb. 8, 2024

(51) Int. Cl.
   *G06F 12/1027*    (2016.01)
   *G06F 12/1072*    (2016.01)
   *G06F 12/1081*    (2016.01)

(52) U.S. Cl.
   CPC ...... *G06F 12/1027* (2013.01); *G06F 12/1072* (2013.01); *G06F 12/1081* (2013.01); *G06F 2212/1016* (2013.01)

(58) Field of Classification Search
   CPC ......... G06F 12/1027; G06F 2212/1016; G06F 2212/684; G06F 12/1009; G06F 2212/1024; G06F 9/5027; G06F 9/5016; G06F 12/1081; G06F 12/1036; G06F 12/10; G06F 2212/681; G06F 12/1072
   See application file for complete search history.

(56) References Cited

U.S. PATENT DOCUMENTS

| | | | | |
|---|---|---|---|---|
| 2014/0281679 | A1* | 9/2014 | Giroux | G06F 11/141 |
| | | | | 714/6.1 |
| 2019/0196978 | A1* | 6/2019 | Basu | G06F 12/1027 |
| 2019/0384722 | A1* | 12/2019 | Basu | G06F 11/3471 |
| 2023/0409197 | A1* | 12/2023 | Guo | G06F 3/0673 |

OTHER PUBLICATIONS

Shin, S., Cox, G., Oskin, M., Loh, G. H., Solihin, Y., Bhattacharjee, A., & Basu, A. (2018). Scheduling page table walks for irregular GPU applications. 2018 ACM/IEEE 45th Annual International Symposium on Computer Architecture (ISCA). https://doi.org/10.1109/isca.2018.00025.

* cited by examiner

*Primary Examiner* — Kenneth M Lo
*Assistant Examiner* — Hewy H Li
(74) *Attorney, Agent, or Firm* — WPAT, P.C.; Anthony King

(57) ABSTRACT

The present application discloses a computing system and an associated method. The computing system includes a memory, a master computing device and a slave computing device. The master computing device includes a memory controller and an input-output memory management unit (IOMMU). When the slave computing device accesses a first virtual address, and a first translation lookaside buffer (TLB) of the slave computing device does not store the first virtual address, the first TLB sends a translation request to the IOMMU. The IOMMU traverses page tables of the memory controller to obtain a first physical address corresponding to the first virtual address, selects and clears a first virtual address entry from a second TLB of the computing system according to a recent use time and a dependent workload of each virtual address entry to store the first virtual address and the first physical address.

20 Claims, 6 Drawing Sheets

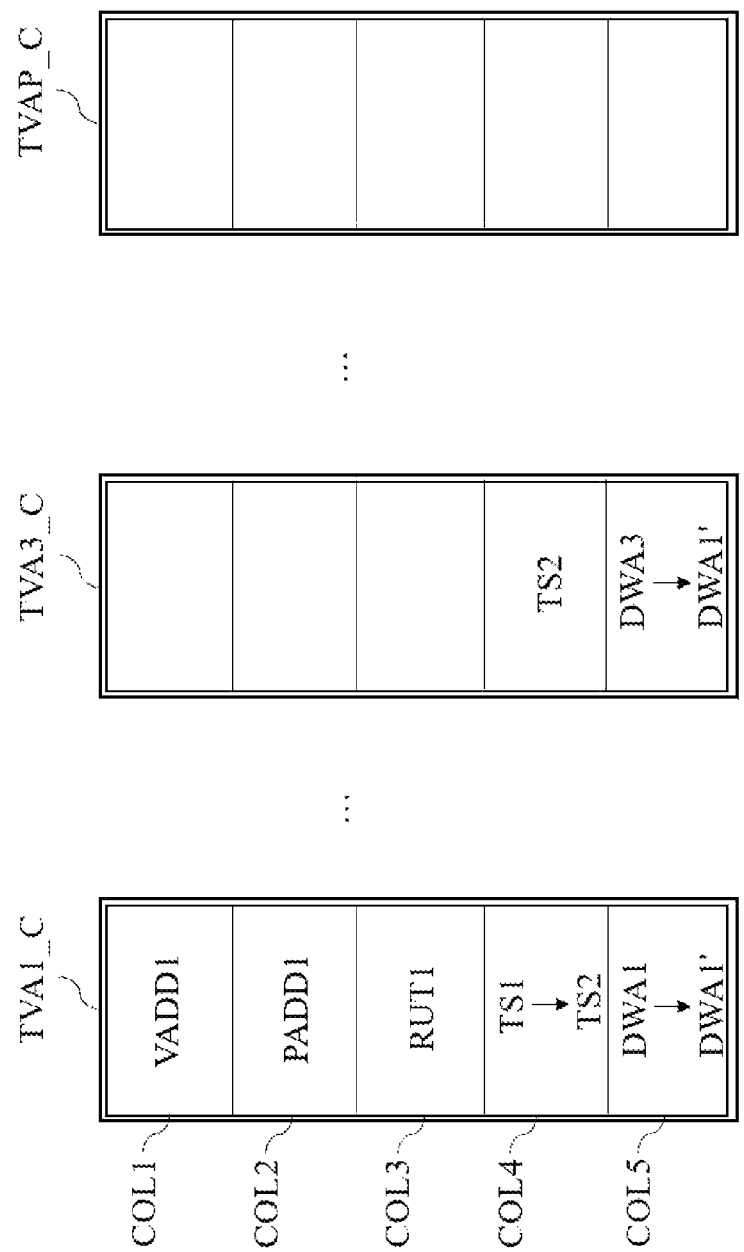

MANAGEMENT OF IOMMU TLB ENTRIES FOR COMPUTE UNITS OF A SIMD PROCESSING DEVICE

CROSS-REFERENCE TO RELATED APPLICATIONS

This application claims priority of China application No. 202210921932.4, filed on Aug. 2, 2022, which is incorporated by reference in its entirety.

TECHNICAL FIELD

The present application relates to a computing system, and particularly to a computing system capable of reducing the overall address translation time.

BACKGROUND

Since the graphic processing unit (GPU) is able to perform computations on large amounts of data in parallel in a single instruction multiple data (SIMD) fashion, it is often used to perform a variety of applications that require large amounts of computation, such as deep learning models, and is no longer limited to drawing 3D images. As the GPU plays an increasingly important role in computing systems, some computing systems have started to use shared virtual memory (SVM) for the GPU and the central processing unit (CPU). That is, the virtual memory used by the GPU and the virtual memory used by the CPU can correspond to the same physical memory, thereby increasing the compatibility of the two in computing.

However, since the GPU often performs computations in the SIMD manner and the computation of SIMD can only begin after all the data is obtained, the translation lookaside buffer (TLB) of the GPU often receives translation requests for multiple virtual addresses of the data involved in the same instruction at the same time; however, if the translation lookaside buffer has to serve multiple translation requests of the same instruction for a long time, it may delay the translation requests of other instructions, resulting in a long waiting time for the overall translation and a decrease in the performance of the GPU. Therefore, how to reduce the waiting time of the computing system for translation so as to improve the overall performance has become an urgent issued to be addressed in the related field.

SUMMARY

One embodiment of the present disclosure discloses a computing system. The computing system includes a memory, a slave computing device, and a master computing device. The slave computing device includes a plurality of computing units and a first translation lookaside buffer (TLB). Each computing unit is configured to perform multiple computations in parallel according to a single instruction multiple data (SIMD) manner. The first translation lookaside buffer is configured to store a plurality of virtual address entries. The master computing device includes a memory controller, at least one processing unit, and an input-output memory management unit (IOMMU). The memory controller is configured to perform a read operation and a write operation to the memory. The at least one processing unit is configured to access the memory via the memory controller to execute a program. The input-output memory management unit includes a second translation lookaside buffer, and the second translation lookaside buffer is configured to store a plurality of virtual address entries. Each virtual address entry is configured to store a virtual address requested by the slave computing device, a physical address corresponding to the virtual address, a recent use time and a dependent workload. Wherein the virtual address is used in a specific instruction performed by a specific computing unit of the plurality of computing units, and the dependent workload of the virtual address is an amount of virtual address translations requested by the specific computing unit to perform the specific instruction. When the plurality of computing units access a first virtual address, the plurality of computing units transfer the first virtual address to the first translation lookaside buffer to obtain a first physical address corresponding to the first virtual address. When the first translation lookaside buffer does not store a virtual address entry including the first virtual address, the first translation lookaside buffer is configured to send a first translation request to the input-output memory management unit to obtain the first physical address corresponding to the first virtual address. When the input-output memory management unit receives the first translation request, and the second translation lookaside buffer does not store a virtual address entry including the first virtual address, the input-output memory management unit is configured to traverse a plurality of page tables of the memory controller to obtain the first physical address corresponding to the first virtual address, select a first virtual address entry from the plurality of virtual address entries according to a recent use time and a dependent workload of each of the plurality of virtual address entries, and clear the first virtual address entry to store the first virtual address and the first physical address.

Another embodiment of the present disclosure discloses a master computing device including a memory controller, at least one processing unit, and an aforementioned input-output memory management unit in the master computing device.

Another embodiment of the present disclosure discloses a slave computing device including a plurality of computing units and an aforementioned first translation lookaside buffer. Each computing unit is configured to perform multiple computations in parallel according to a single instruction multiple data (SIMD) manner.

Another embodiment of the present disclosure discloses a computing system method. The computing system includes a slave computing device and a master computing device, wherein the slave computing device includes a first translation lookaside buffer, the master computing device includes an input-output memory management unit, and the input-output memory management unit includes a second translation lookaside buffer. The method includes storing a plurality of virtual address entries in the second translation lookaside buffer, wherein, in each virtual address, a virtual address requested by the slave computing device, a physical address corresponding to the virtual address, a recent use time and a dependent workload are stored, the virtual address is used in a specific instruction performed by a specific computing unit of the slave computing device, and the dependent workload of the virtual address is an amount of virtual address translations requested by the specific computing unit to perform the specific instruction. The method further includes when the slave computing device accesses a first virtual address, looking up a first physical address corresponding to the first virtual address in the first translation lookaside buffer; when the first translation lookaside buffer does not store a virtual address entry comprising the first virtual address, using the first translation lookaside buffer to send a first translation request to the input-output memory management unit to obtain the first physical address corresponding to the first virtual address; when the input-output memory management unit receives the first translation request, and the second translation lookaside buffer does not store a virtual address entry comprising the first virtual address, traversing a plurality of page tables of the memory controller to obtain the first physical address corresponding to the first virtual address; selecting a first virtual address entry from the plurality of virtual address entries according to a recent use time and a dependent workload of each of the plurality of virtual address entries; and clearing the first virtual address entry to store the first virtual address and the first physical address.

Since the computing system, the master computing device, the slave computing device and the associated method of the present application can select the virtual address entries in the translation lookaside buffer that should be prioritized for elimination according to the dependent workload of translation requests, so that computing units with fewer translation requests can have a higher chance of hitting in the translation lookaside buffer, thereby achieving a "short job first" mechanism and reducing the overall waiting time of computing units for translation so as to improve the performance of the computing system.

BRIEF DESCRIPTION OF THE DRAWINGS

Aspects of the present disclosure are best understood from the following detailed description when read with the accompanying figures. It should be noted that, in accordance with the standard practice in the field, various structures are not drawn to scale. In fact, the dimensions of the various structures may be arbitrarily increased or reduced for the clarity of discussion.

FIG. 6 is a schematic diagram illustrating virtual address entries in the translation lookaside buffer of FIG. 4 according to another embodiment.

DETAILED DESCRIPTION

Figure 1:
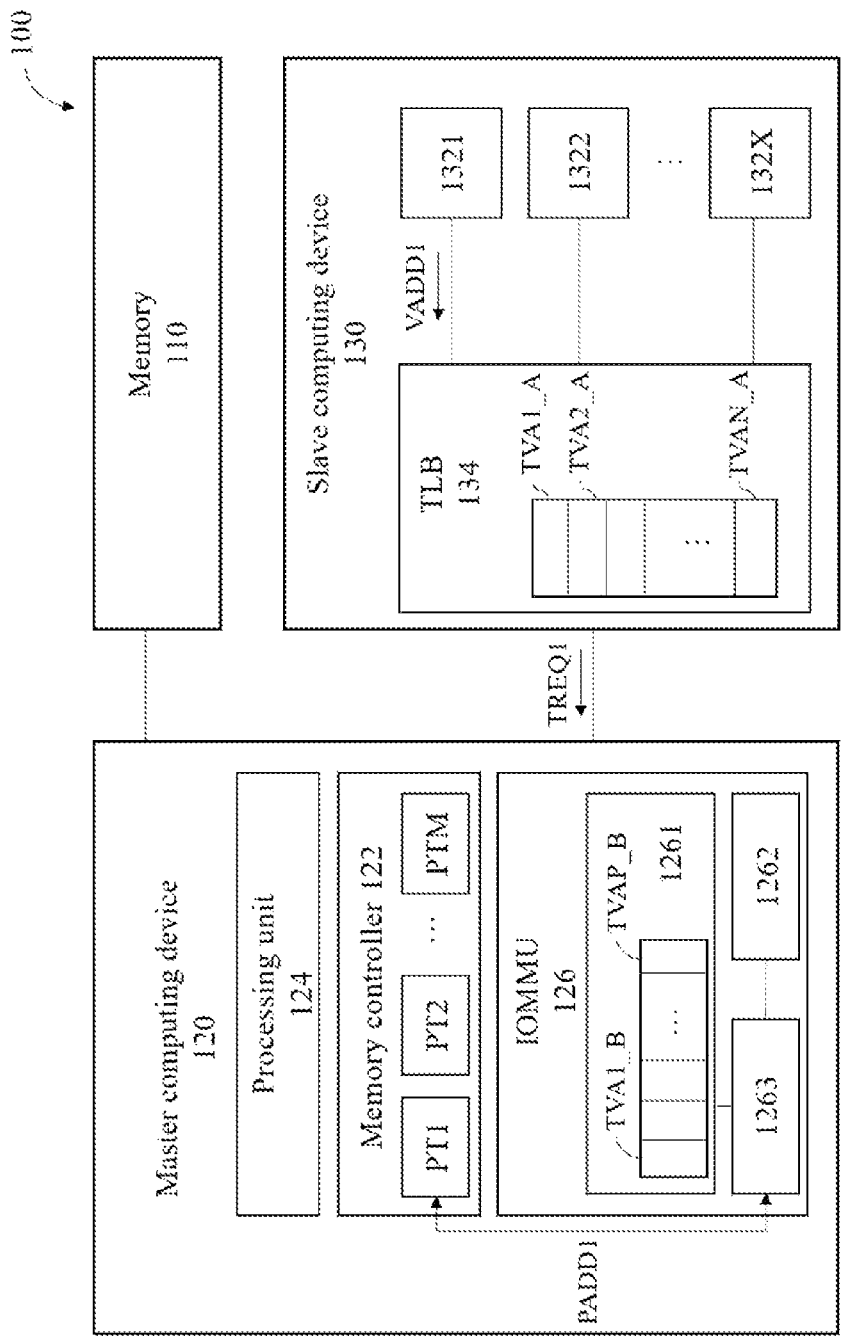
FIG. 1 is a schematic diagram illustrating a computing system according to one embodiment of the present application.

The following disclosure provides various different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "generally" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "generally." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 is a schematic diagram illustrating a computing system according to one embodiment of the present application. As shown in FIG. 1, a computing system 100 can include a memory 110, a master computing device 120 and a slave computing device 130. In the present embodiment, the master computing device 120 can be, for example, a central processing unit (CPU) in the computing system 100, whereas the slave computing device 130 can be, for example, a graphic processing unit (GPU) in the computing system 100. Moreover, the master computing device 120 and the slave computing device 130 can use a shared virtual memory, that is, the master computing device 120 and the slave computing device 130 may share a same virtual-physical translation mechanism for accessing the memory 110.

The master computing device 120 can include a memory controller 122, at least one processing unit 124 and an input-output memory management unit (IOMMU) 126. The memory controller 122 can perform a read operation and a write operation on the memory 110, whereas the processing unit 124 can access the data and/or instruction stored in the memory 110 via the memory controller 122 to execute a program. Moreover, the slave computing device 130 can include a plurality of computing units 1321 to 132X and a translation lookaside buffer (TLB) 134, wherein X is an integer greater than 1. Each of the computing units 1321 to 132X can be configured to perform multiple computations in parallel in a single instruction multiple data manner, and when a computing unit accesses a specific virtual address, for example, when the computing unit 1321 needs to access the data in the virtual address VADD1, the computing unit 1321 can use the translation lookaside buffer 134 to lookup a plurality of virtual address entries TVA1_A to TVAN_A stored therein so as to obtain a physical address corresponding to the virtual address VADD1, wherein N is an integer greater than 1. As such, the slave computing device 130 can use the physical address corresponding to the virtual address VADD1 to access the data in the memory 110.

However, if the translation lookaside buffer 134 does not store any entry that includes the virtual address VADD1, then the translation lookaside buffer 134 may further send a translation request TREQ1 to the input-output memory management unit 126 in the master computing device 120. When the input-output memory management unit 126 receives the translation request TREQ issued from the translation lookaside buffer 134 of the slave computing device 130, the input-output memory management unit 126 can first check if any entry in the translation lookaside buffer 1261 stored therein has included the virtual address VADD1 so as to obtain the physical address corresponding to the virtual address VADD1. If the translation lookaside buffer 1261 does not store any virtual address entry including the virtual address VADD1, the input-output memory management unit 126 can then traverse a plurality of the page tables PT1 to PTM in the memory controller 122 to obtain the physical address PADD1 corresponding to the virtual address VADD1, and then store the information of the virtual address VADD1 and its physical address PADD1 in the translation lookaside buffer 1261, wherein M is an integer greater than 1.

Since the computing units 1321 to 132X must obtain multiple entries of data in advance when performing computations in the single instruction multiple data manner, the computing units 1321 to 132X may send out inquires for a plurality of virtual addresses to the translation lookaside buffer 134 within at once, which may result in a plurality of translation requests being received by the input-output memory management unit 126 in a short period of time. Moreover, according to way that the single instruction multiple data is executed, the computing units 1321 to 132X must obtain all the required data before the parallel computations of multiple entries of data begin. In such case, if certain computing units send out more translation requests, it may cause the input-output memory management unit 126 to be occupied for a long time, so that other computing units that only send out a few translation requests need to wait for a long time to obtain the translation service of the memory management unit 126, thereby reducing the overall computing performance.

In the present embodiment, the memory management unit 126 can eliminate the virtual address entry in the translation lookaside buffer 1261 according to a short job first (SJF) mechanism, so that the computing unit sending out fewer translation requests can be served first. Consequently, the overall waiting time for address translation of the computing units 1321 to 132X can be reduced, thereby increasing the performance of the computing system 100.

Figure 2:
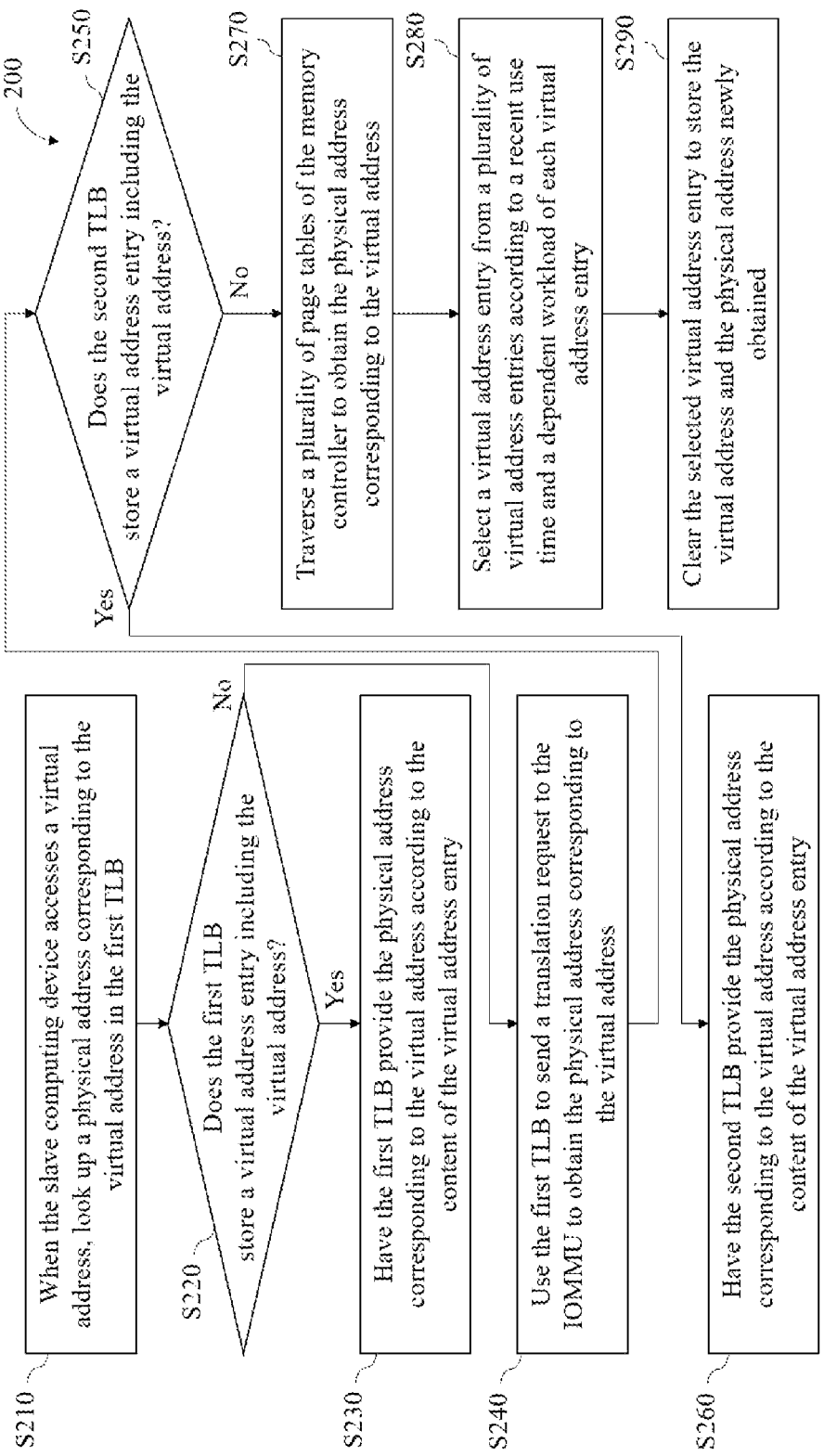
FIG. 2 is a schematic diagram illustrating a computing system method according to one embodiment of the present application.

FIG. 2 is a schematic diagram illustrating a computing system method according to one embodiment of the present application. In the present embodiment, the computing system method M1 can include Steps S210 to S290, and the computing system method M1 can be applied to the computing system 100.

In Step S210, when a computing unit in the slave computing device 130 accesses a specific virtual address, for example, when the computing unit 1321 needs to access the virtual address VADD1, the computing unit 1321 can look for the physical address PADD1 corresponding to the virtual address VADD1 in the translation lookaside buffer 134. In some embodiments, the slave computing device 130 can further include X translation lookaside buffers, so that each of the computing units 1321 to 132X can have its own translation lookaside buffer. In such case, each of the computing units 1321 to 132X can perform the lookup in its own translation lookaside buffer, and then perform the lookup in the translation lookaside buffer 134 shared by the computing units 1321 to 132X after finding no physical address PADD1 of the virtual address VADD1 in its own translation lookaside buffer; however, the present application is not limited thereto.

In Step S220, if the translation lookaside buffer 134 has a virtual address entry including the virtual address VADD1, then next in Step S230, the translation lookaside buffer 134 can provide the physical address PADD1 corresponding to the virtual address VADD1 according to the content of the virtual address entry, so that the data in the memory can be accessed accordingly.

However, in Step S220, if the translation lookaside buffer 134 does not have any virtual address entry including the virtual address VADD1, then next in Step S240, the translation lookaside buffer 134 would send a translation request TREQ1 to the input-output memory management unit 126 to obtain the physical address PADD1 corresponding to the virtual address VADD1.

When the input-output memory management unit 126 receives the translation request TREQ1, it can perform Step 250 to check if the translation lookaside buffer 1261 has a virtual address entry including the virtual address VADD1 stored therein. If the translation lookaside buffer 1261 already has a virtual address entry including the virtual address VADD1, then next in Step S260, the translation lookaside buffer 1261 can provide the physical address PADD1 corresponding to the virtual address VADD1 according to the content of the virtual address entry, so that the data in the memory can be accessed accordingly.

However, in Step S250, if the translation lookaside buffer 1261 does not have a virtual address entry including the virtual address VADD1, then next in Step S270, a plurality of the page tables PT1 to PTM stored in the memory controller 122 in the master computing device 120 would be traversed, thereby retrieving the physical address PADD1 corresponding to the virtual address VADD1. In the present embodiment, the input-output memory management unit 126 can further include a translation request cache 1262 and a page table walker 1263. The Translation request cache 1262 can store a plurality of translation requests sent from the translation lookaside buffer 134, whereas the page table walker 1263, while being idle, can select at least one translation request from a plurality of translation requests stored in the translation request cache 1262, and traverse the page tables PT1 to PTM of the memory controller 122 to retrieve at least one physical address corresponding to at least one virtual address in the at least one translation request. That is, in the present embodiment, the input-output memory management unit 126 can use the translation request cache 1262 and the page table walker 1263 to perform Step S270; however, the present application is not limited thereto.

In the present embodiment, as shown in FIG. 1, the input-output memory management unit 126 has already stored a plurality of virtual address entries TVA1_B to TVAP_B in the translation lookaside buffer 1261 due to previous operations, wherein P is an integer greater than 1. In such case, if storage of the translation lookaside buffer 1261 is full, then one virtual address entry of the virtual address entries TVA1_B to TVAP_B should be cleared, so as to store the virtual address VADD1 and the physical address PADD1 newly obtained in Step S270. In the present embodiment, in order to preferentially satisfy computing units that send out fewer translation requests first, in Step S280, the translation lookaside buffer 1261 can select the virtual address entry that should be eliminated first from the virtual address entries TVA1_B to TVAP_B according to a recent use time and a dependent workload of each virtual address entry in the virtual address entries TVA1_B to TVAP_B, and in Step S290, clear the virtual address entry that should be eliminated so as to create a virtual address entry for the virtual address VADD1, and store the physical address PADD1 in virtual address entry of the virtual address VADD1.

Figure 3:
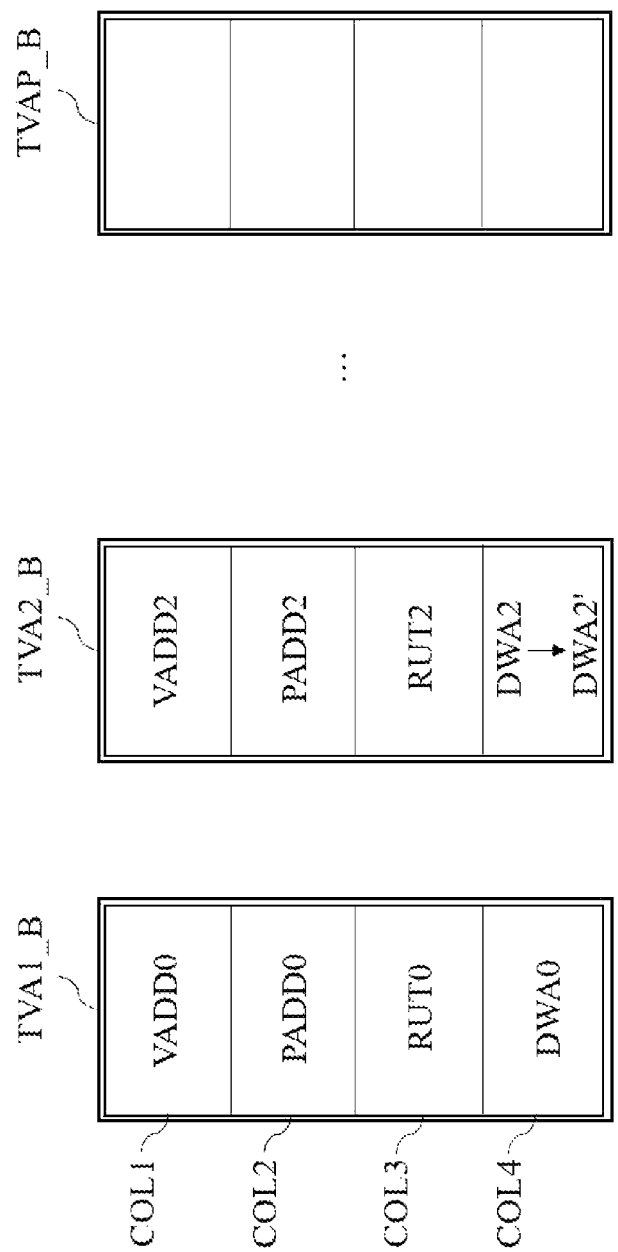
FIG. 3 is a schematic diagram illustrating virtual address entries in the translation lookaside buffer of FIG. 1 according to one embodiment.

FIG. 3 is a schematic diagram illustrating the virtual address entries TVA1_B to TVAP_B in the translation lookaside buffer 1261 according to one embodiment. As shown in FIG. 3, using the virtual address entry TVA1_B as an example, the virtual address entry TVA1_B can include four columns COL1 to COL4 for storing a virtual address VADD0, a physical address PADD0 corresponding to the virtual address VADD0, a recent use time RUT0 of the virtual address entry TVA1_B and a dependent workload DWA0 of the virtual address entry TVA1_B respectively. In some embodiments, the translation lookaside buffer 3261 can include a timer, configured to calculate the time since the virtual address entries TVA1_B to TVAP_B were last used. Moreover, for ease of management, in some embodiments, the virtual address entries TVA1_B to TVAP_B may be arranged according to the recent use time, for example, from the virtual address entry with the longest recent use time to the virtual address entry with the shortest recent use time. In such case, each time when a virtual address entry is selected, the recent used time of said virtual address entry would be reset to zero and moved to a position designated for the virtual address entry with the shortest recent used tome; however, the present application is not limited thereto.

In the present embodiment, each virtual address entry TVA1_B to TVAP_B is created after traversing the page table PT1 to PTM because of the translation requests sent by a specific computing unit for execution of a specific instruction, and the dependent workload in each virtual address entry is the number of translation requests sent by the same computing unit for the same instruction. For example, if the computing unit 1321 sends translation requests for five virtual addresses (including the virtual address VADD0) during the execution of a specific instruction, the dependent workload DWA0 in the virtual address entry TVA1_B is 5. By storing the dependent workload corresponding to each virtual address in the virtual address entries TVA1_B to TVAP_B, the input-output memory management unit 126 can then know which virtual address entries involve fewer other translations and can preferentially reserve them in the translation lookaside buffer 1261 to increase the chance that the computing unit with fewer translation requests can hit the desired virtual address entry in the translation lookaside buffer 1261. In contrast, the input-output memory management unit 126 may prioritize the elimination of the virtual address entries in the translation lookaside buffer 1261 having a larger dependent workload, so as to prevent the computing units with more translation requests from occupying the resources of the translation lookaside buffer 1261 and causing the other computing units to wait for too long.

In the present embodiment, in Step S280, the input-output memory management unit 126 can select a virtual address entry with the longest recent use time and the largest dependent workload from the virtual address entries TVA1_B to TVAP_B in the translation lookaside buffer 1261 (e.g., virtual address entry TVA1_B), and in Step S290, clear the content of the selected virtual address entry TVA1_B so as to store the virtual address VADD1 and its related information.

In the present embodiment, the slave computing device 130 can calculate the amount of translation requests of virtual addresses corresponding to the same computing unit and the same instruction at the time when the translation lookaside buffer 134 sends the translation request, thereby setting a dependent workload for each virtual address and including the virtual address and information of its dependent workload in the translation request. In this way, when the translation lookaside buffer 1261 receives the translation request, it can obtain the dependent workload corresponding to the requested virtual address, and can store a physical address corresponding to the virtual address and its dependent workload together into the virtual address entry, after traversing and retrieving the physical addresses.

Moreover, in some embodiments, if a recent use time of the virtual address entry has exceeded a system threshold value, it means that the virtual address entry has not been used for a long time, thus, the input-output memory management unit 126 can eliminate and clear this virtual address entry first. That is, in some embodiments, in Step S280, the input-output memory management unit 126 can first determine whether there is any virtual address entry having a recent use time exceeding the system threshold value, and if there is any virtual address entry having a recent use time exceeding the system threshold value, then said virtual address entry can be cleared first. However, if there is no virtual address entry having a recent use time exceeding the system threshold value, then the input-output memory management unit 126 can choose to clear the virtual address entry having the longest recent use time and largest dependent workload.

Furthermore, different computing units can send translation requests for the same virtual address. In such case, even if a translation request sent earlier does not find a corresponding virtual address entry in the translation lookaside buffer 1261, the input-output memory management unit 126 can still traverse the page tables PT1 to PTM using the page table walker 1263 and create a corresponding virtual address entry in the translation lookaside buffer 1261; thus, the later sent translation request has certain possibility to find the corresponding virtual address entry in the translation lookaside buffer 1261. In the present embodiment, in order to maintain the aforementioned mechanism of eliminating a virtual address entry in the translation lookaside buffer 1261, when the input-output memory management unit 126 receives a translation request, and the translation lookaside buffer 1261 has stored therein a virtual address entry including the virtual address in the translation request, the input-output memory management unit 126 can reset the recent use time of the virtual address entry as 0, and can update the dependent workload of the virtual address entry according to the dependent workload of the later sent translation request.

For example, as shown in FIG. 3, the virtual address entry TVA2_B has stored therein the virtual address VADD2 and its corresponding physical address PADD2. Thus, when the input-output memory management unit 126 receives another translation request including the virtual address VADD2 and the dependent workload DWA2', the translation lookaside buffer 1261 can change the dependent workload DWA2 previously recorded in the virtual address entry TVA2_B to the second dependent workload DWA2', and can reset the recent use time RUT2 of the virtual address entry TVA2_B.

In the embodiment shown in FIG. 1, the slave computing device 130 can calculate the amount of translation requests of virtual addresses corresponding to the same computing unit and the same instruction when the translation lookaside buffer 134 sends the translation request, thereby setting a dependent workload for each virtual address and including the virtual address and information of its dependent workload in the translation request. However, the present application is not limited thereto; in some other embodiments, the translation lookaside buffer 134 can set a dependent work number of the virtual address according to the computing unit and the instruction corresponding to the requested virtual address and include the information of the dependent work number in the translation request when sending the translation request. In such case, the input-output memory management unit 126 can calculate the number of virtual address having the same dependent work number when receiving the translation request, thereby setting a dependent workload for each virtual address entry in the translation lookaside buffer 1261, and then eliminating virtual address entry in the translation lookaside buffer 1261 according to the aforementioned mechanism.

Figure 4:
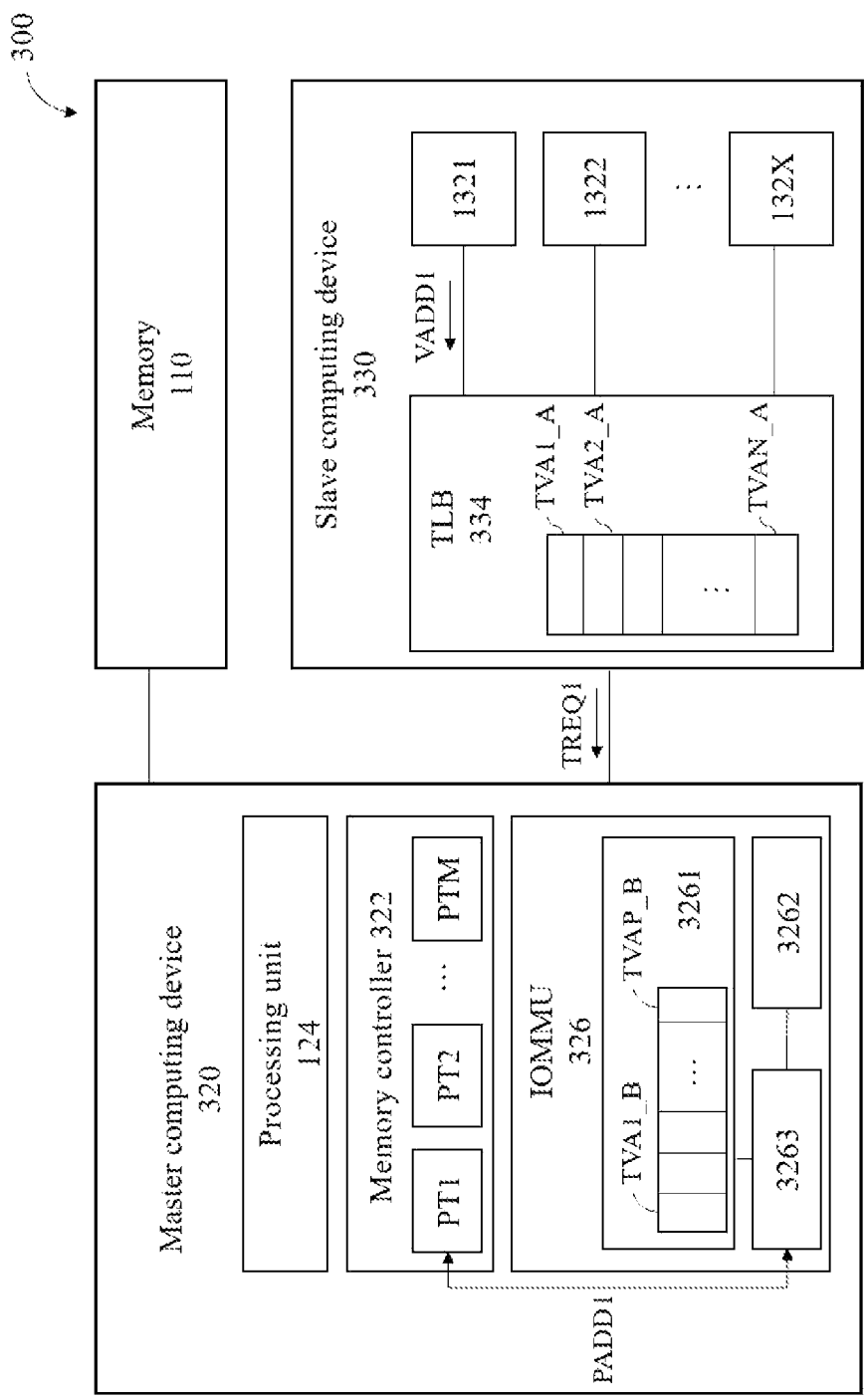
FIG. 4 is a schematic diagram illustrating a computing system according to another embodiment of the present application.

FIG. 4 is a schematic diagram illustrating a computing system according to another embodiment of the present application. The computing system 300 and the computing system 100 have similar structures and can operate according to the same principle. The computing system 300 can include a memory 110, a master computing device 320 and a slave computing device 320. In the computing system 300, when the computing unit 1321 looks for the physical address of the virtual address VADD1 in a translation lookaside buffer 334, and the translation lookaside buffer 334 does not contain an entry including the virtual address VADD1, the translation lookaside buffer 334 can set a dependent work number of the virtual address VADD1 according to the computing unit 1321 and the instruction that trigger the translation request for the virtual address VADD1, and include the dependent work number in the translation request TREQ1 for the virtual address VADD1. Consequently, the input-output memory management unit 326 would be able to calculate a dependent workload corresponding to each virtual address according to the dependent work number of each virtual address.

Figure 5:
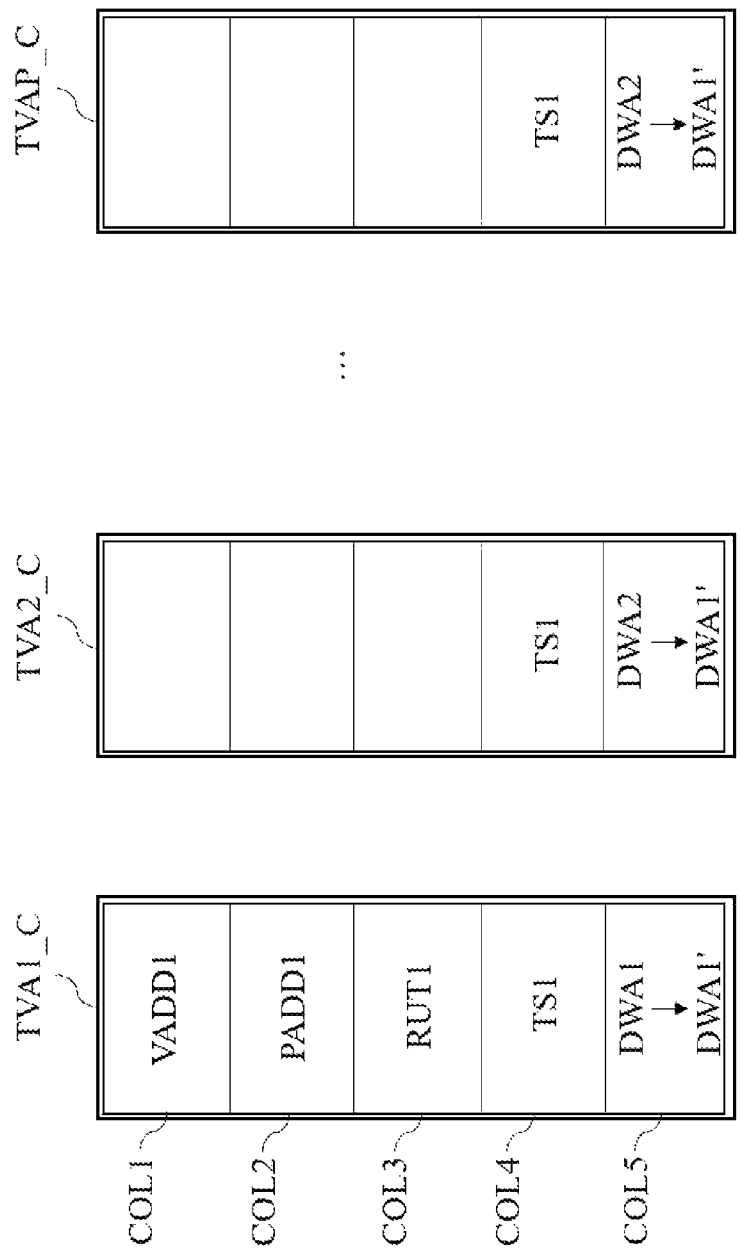
FIG. 5 is a schematic diagram illustrating virtual address entries in the translation lookaside buffer of FIG. 4 according to one embodiment.

FIG. 5 is a schematic diagram illustrating virtual address entries TVA1_C to TVAP_C in the translation lookaside buffer 3261 according to one embodiment. As shown in FIG. 5, for example, the virtual address entry TVA1_C can have five columns COL1 to COL5, which can be used to respectively store the virtual address VADD1, the physical address PADD1 corresponding to the virtual address VADD1, a recent use time RUT1 of the virtual address entry TVA1_C, a dependent work number TS1 of the virtual address entry TVA1_C, and a dependent workload DWA1 of the virtual address entry TVA1_C.

In the present embodiment, when the translation lookaside buffer 3261 stores the virtual address VADD1 to the virtual address entry TVA1_C, the translation lookaside buffer 3261 not only stores the dependent work number TS1 in the virtual address entry TVA1_C, but also increase the dependent workload of the virtual address entry in the translation lookaside buffer 3261 that also includes the same dependent work number TS by one, so as to obtain an updated dependent workload DWA1, and store the dependent workload DWA1 in the virtual address entry TVA1_C. For example, before storing the virtual address VADD1 to the virtual address entry TVA1_C, if the virtual address entries TVA2_C and TVAP_C in the translation lookaside buffer 3261 have stored a dependent work number that is the same as the dependent work number TS1 of the virtual address VADD1, and the dependent workload of the virtual address entries TVA2_C and TVAP_C is DWA2, then when storing the virtual address VADD1 to the virtual address entry TVA1_C, the translation lookaside buffer 3261 can increase the dependent workload DWA2 of the virtual address entries TVA2_C and TVAP_C by one to become DWA1', and change the dependent workload of all of the virtual address entries TVA1_C, tVA2_C and TVAP_C to the dependent workload DWA1'. In this way, the translation lookaside buffer 3261 can maintain the correctness of the dependent workload of each virtual address entry.

Moreover, when the input-output memory management unit 326 receives a translation request, and the translation lookaside buffer 3261 has stored a virtual address entry including the virtual address of the translation request, the input-output memory management unit 326 can reset the recent use time of the virtual address entry to 0, and can change the dependent work number of the virtual address entry to the dependent work number in the translation request. In addition, the input-output memory management unit 326 can further increase the dependent workload of a virtual address entry in the translation lookaside buffer 3261 having the same dependent work number as the translation request by one, so as to update its dependent workload, and store the updated dependent workload in the virtual address entry.

FIG. 6 is a schematic diagram illustrating virtual address entries TVA1_C to TVAP_C in the translation lookaside buffer 3261 according to another embodiment. As shown in FIG. 6, the virtual address entry TVA1_C has stored therein the virtual address VADD1 and the physical address PADD1 corresponding thereto. Thus, when the input-output memory management unit 326 receives a translation request including the virtual address VADD1 and a dependent work number TS2, the translation lookaside buffer 3261 can change the dependent work number TS1 previously recorded in the virtual address entry TVA1_C to the dependent work number TS2 recorded in the present translation request, and can reset the recent use time RUT1 of the virtual address entry TVA1_C to zero. Furthermore, if the virtual address entry TVA3_C in the translation lookaside buffer 3261 has the same dependent work number TS2 as the virtual address entry TVA1_C, then the translation lookaside buffer 3261 can further increase the dependent workload DWA3 of the virtual address entry TVA3_C by one to become DWA1', and set the dependent workload of both the virtual address entries TVA1_C and TVA3_C as the dependent workload DWA1'. In this way, the translation lookaside buffer 3261 can maintain the correctness of the dependent workload of each virtual address entry.

In summary, the computing system, master computing device, slave computing device and associated method of the present application can select the virtual address entries in the translation lookaside buffer that should be prioritized for elimination based on the relative workload of translation requests, so that computing units with fewer translation requests can have a higher chance of hitting in the translation lookaside buffer, thereby achieving a short job first mechanism, reducing the overall waiting time of computing units for translation, and improving the performance of the computing system.

The foregoing description briefly sets forth the features of some embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A computing system, comprising:
a memory;
a slave computing device, comprising:
a plurality of computing units, wherein each computing unit is configured to perform multiple computations in parallel according to a single instruction multiple data (SIMD) manner; and
a first translation lookaside buffer (TLB), configured to store a plurality of virtual address entries; and
a master computing device, comprising:
a memory controller, configured to perform a read operation and a write operation to the memory;
at least one processing unit, configured to access the memory via the memory controller to execute a program; and
an input-output memory management unit (IOMMU), comprising a second translation lookaside buffer, configured to store a plurality of virtual address entries, wherein each virtual address entry is configured to store a virtual address requested by the slave computing device, a physical address corresponding to the virtual address, a recent use time and a dependent workload, wherein the virtual address is used in a specific instruction performed by a specific computing unit of the plurality of computing units, and the dependent workload of the virtual address is an amount of virtual address translations requested by the specific computing unit to perform the specific instruction;
wherein:
when the plurality of computing units access a first virtual address, the plurality of computing units transfer the first virtual address to the first translation lookaside buffer to obtain a first physical address corresponding to the first virtual address;
when the first translation lookaside buffer does not store a virtual address entry comprising the first virtual address, the first translation lookaside buffer is configured to send a first translation request to the input-output memory management unit to obtain the first physical address corresponding to the first virtual address;
when the input-output memory management unit receives the first translation request, and the second translation lookaside buffer does not store a virtual address entry comprising the first virtual address, the input-output memory management unit is configured to traverse a plurality of page tables of the memory controller to obtain the first physical address corresponding to the first virtual address, select a first virtual address entry from the plurality of virtual address entries according to a recent use time and a dependent workload of each of the plurality of virtual address entries, and clear the first virtual address entry to store the first virtual address and the first physical address.

2. The computing system of claim 1, wherein the first virtual address entry is a virtual address entry having a longest recent use time and a largest dependent workload among the plurality of virtual address entries.

3. The computing system of claim 1, wherein the input-output memory management unit further comprises:
a translation request cache, configured to store a plurality of translation requests issued by the first translation lookaside buffer; and
a page table walker, configured to, while being idle, select at least one translation request from the plurality of translation requests, and traverse the plurality of page tables of the memory controller to obtain at least one physical address corresponding to at least one virtual address of the translation request.

4. The computing system of claim 1, wherein the first translation lookaside buffer is further configured to calculate a dependent workload of the first virtual address, and the first translation request comprises the first virtual address and the dependent workload of the first virtual address.

5. The computing system of claim 4, wherein when the input-output memory management unit receives a second translation request comprising a second virtual address and a second dependent workload, and the second translation lookaside buffer has stored a second virtual address entry comprising the second virtual address, the second translation lookaside buffer is further configured to change a dependent workload previously recorded in the second virtual address entry to the second dependent workload.

6. The computing system of claim 5, wherein the second translation lookaside buffer is further configured to reset a recent use time of the second virtual address entry, after changing the dependent workload previously recorded in the second virtual address entry to the second dependent workload.

7. The computing system of claim 1, wherein the first translation lookaside buffer is further configured to set a first dependent work number of the first virtual address according to a computing unit and instruction corresponding to the first virtual address, and the first translation request comprises the first virtual address and the first dependent work number.

8. The computing system of claim 7, wherein the second translation lookaside buffer is further configured to:
store the first dependent work number in the first virtual address entry;
increase a dependent workload of at least one virtual address entry that also comprises the first dependent work number in the second translation lookaside buffer by one, to obtain a first dependent workload; and
store the first dependent workload in the first virtual address entry.

9. The computing system of claim 7, wherein, when the input-output memory management unit receives a second translation request comprising a second virtual address and a second dependent work number, and the second translation lookaside buffer has stored a second virtual address entry comprising the second virtual address, the second translation lookaside buffer is further configured to:
change a dependent work number of the second virtual address entry to the second dependent work number;
increase a dependent workload of at least one virtual address entry that also comprises the second dependent work number in the second translation lookaside buffer by one, to obtain a second dependent workload; and
store the second dependent workload in the second virtual address entry.

10. The computing system of claim 1, wherein the master computing device is a central processing unit, and the slave computing device is a graphic processing unit.

11. A master computing device, comprising:
a memory controller;
at least one processing unit; and
an input-output memory management unit of claim 1.

12. A slave computing device, comprising:
a plurality of computing units, wherein each computing unit is configured to perform multiple computations in parallel according to a single instruction multiple data (SIMD) manner; and
a first translation lookaside buffer, configured to store a plurality of virtual address entries;
wherein, when the first translation lookaside buffer receives a request to obtain a first physical address corresponding to a first virtual address and the first translation lookaside buffer does not store a virtual address entry comprising the first virtual address, the first translation lookaside buffer calculates a dependent workload of the first virtual address, and sends a first translation request comprising the first virtual address and the dependent workload of the first virtual address to an input-output memory management unit.

13. A computing system method, wherein the computing system comprises a slave computing device and a master computing device, wherein the slave computing device comprises a first translation lookaside buffer, the master computing device comprises an input-output memory management unit, and the input-output memory management unit comprises a second translation lookaside buffer, and the method comprises:
storing a plurality of virtual address entries in the second translation lookaside buffer, wherein, in each virtual address, a virtual address requested by the slave computing device, a physical address corresponding to the virtual address, a recent use time and a dependent workload are stored, the virtual address is used in a specific instruction performed by a specific computing unit of the slave computing device, and the dependent workload of the virtual address is an amount of virtual address translations requested by the specific computing unit to perform the specific instruction;
the slave computing device accessing a first virtual address;
looking up a first physical address corresponding to the first virtual address in the first translation lookaside buffer;
the first translation lookaside buffer not storing a virtual address entry comprising the first virtual address;
using the first translation lookaside buffer to send a first translation request to the input-output memory management unit to obtain the first physical address corresponding to the first virtual address;
the input-output memory management unit receiving the first translation request, wherein the second translation lookaside buffer of the input-output memory management unit does not store a virtual address entry comprising the first virtual address;
traversing a plurality of page tables of the memory controller to obtain the first physical address corresponding to the first virtual address;
selecting a first virtual address entry from the plurality of virtual address entries according to a recent use time and a dependent workload of each of the plurality of virtual address entries; and clearing the first virtual address entry to store the first virtual address and the first physical address.

14. The method of claim 13, wherein the first virtual address entry is a virtual address entry having a longest recent use time and a largest dependent workload among the plurality of virtual address entries.

15. The method of claim 13, wherein the input-output memory management unit further comprises a translation request cache and a page table walker, and the method further comprises:
storing a plurality of translation requests issued by the first translation lookaside buffer to the translation request cache;
the page table walker being idle;
selecting at least one translation request from the plurality of translation requests; and
using the page table walker to traverse the plurality of page tables to obtain at least one physical address corresponding to at least one virtual address of the translation request.

16. The method of claim 13, further comprising:
using the first translation lookaside buffer to calculate a dependent workload of the first virtual address;
the input-output memory management unit receiving a second translation request comprising a second virtual address and a second dependent workload, wherein the second translation lookaside buffer has stored a second virtual address entry comprising the second virtual address; and
changing a dependent workload previously recorded in the second virtual address entry to the second dependent workload;
wherein the first translation request comprises the first virtual address and the dependent workload of the first virtual address.

17. The method of claim 16, further comprising:
changing the dependent workload previously recorded in the second virtual address entry to the second dependent workload; and
resetting a recent use time of the second virtual address entry.

18. The method of claim 13, further comprising:
setting a first dependent work number of the first virtual address according to a computing unit and an instruction corresponding to the first virtual address;
wherein the first translation request comprises the first virtual address and the first dependent work number.

19. The method of claim 18, further comprising:
storing the first dependent work number in the first virtual address entry to the second translation lookaside buffer;
increasing a dependent workload of at least one virtual address entry that also comprises the first dependent work number in the second translation lookaside buffer by one, to obtain a first dependent workload; and
storing the first dependent workload in the first virtual address entry.

20. The method of claim 18, further comprising:
the input-output memory management unit receiving a second translation request comprising a second virtual address and a second dependent work number, wherein the second translation lookaside buffer has stored a second virtual address entry comprising the second virtual address;
changing a dependent work number of the second virtual address entry to the second dependent work number;
adding a dependent workload of at least one virtual address entry that also comprises the second dependent work number in the second translation lookaside buffer by one, to obtain a second dependent workload; and storing the second dependent workload in the second virtual address entry.

* * * * *